Sept. 14, 1926.
L. B. WHIPPLE
JOINTER
Filed August 1, 1923
1,599,804
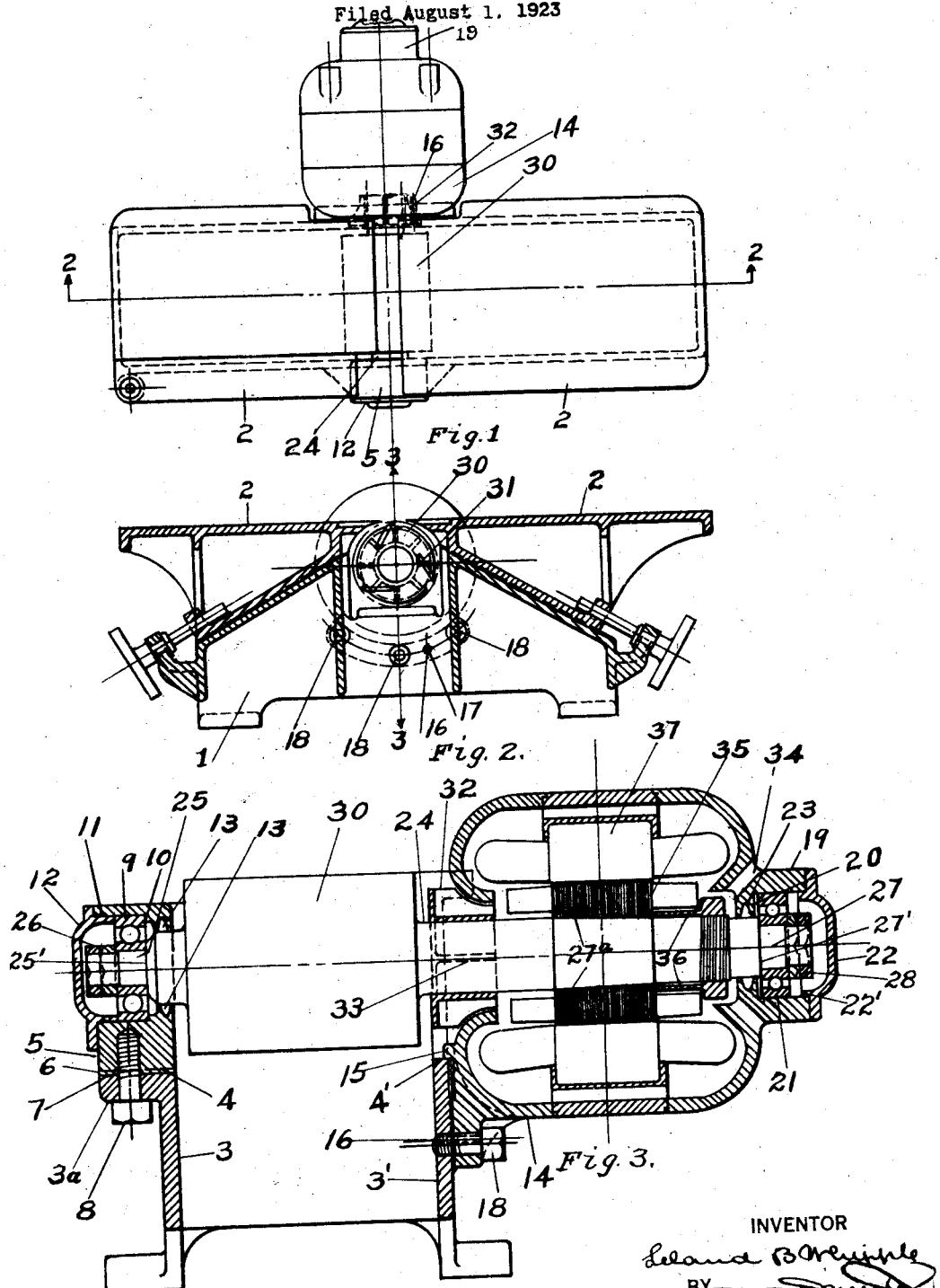
ATTORNEY Patented Sept. 14, 1926.

1,599,804

UNITED STATES PATENT OFFICE.

LELAND B. WHIPPLE, OF ROCHESTER, NEW YORK.

JOINTER.

Application filed August 1, 1923. Serial No. 655,059.

My improvements relate to wood jointing or planing machines wherein the cutter head is fixed to a shaft directly driven by a motor thereon. The leading objects of my invention are to provide a machine having large capacity proportionately to its width; to improve the efficiency of such machines by providing improved means for cooling the motor and diverting dust and detritus therefrom, by securing perfect alignment of the shaft members with the parts coacting therewith and by minimizing binding and friction; and to simplify and standardize the construction and assembly of the parts.

The characteristic features and advantages of my improvements will more fully appear from the following description and the accompanying drawings of a preferred embodiment of my invention.

In the drawings, Fig. 1 is a top plan view of a jointer embodying my improvements; Fig. 2 is a longitudinal sectional view on the line 2—2 of Fig. 1, and Fig. 3 is a transverse sectional view on the line 3—3 of Fig. 2 on an enlarged scale.

As illustrated in the drawings, the main frame 1, on which adjustable tables 2 are supported, has a side wall 3 provided with a flange 3ª having a top surface 4 and a wall 3′ having a top surface 4′, the surfaces 3′ and 4′ lying in the same horizontal plane and preferably are machined in the same operation to provide accurately positioned seats for shaft bearing members. A journaled box 5, aligned on the flange 3ª by the engagement of the feather 6 in the groove 7, is fixed in position by bolts 8. A ball bearing 9 is engaged in the box with its outer race abutting against the shoulder 10, the bearing being held in place by the flange 11 of a cover plate 12. A channel 13 is formed in the box adjacent to the shoulder 10 for the reception of a washer, preferably of felt, coacting with a trunnion of the cutterhead shaft to seal the journal box against the ingress of dirt.

A segmental motor casing 14 has a lip 15 engaging the surface 4′ of the wall 3′ and is aligned relatively to the journal box 7 by a pin 16 registering with a socket 17. The motor casting is secured in position by bolts 18 passing through the motor frame and into the wall 3′. The outer segment of the motor casing has formed therewith a journal box 19 in which is seated a ball bearing 21 having a floating outer race movable between the shoulder 20 and the flange 22′ of a dust cap 22 which closes the end of the journal box. A channel 23 is formed in the journal box wall adjacent to the shoulder 20 for the reception of a dust washer.

A shaft 24 has its journal 25 fixed in the inner race of the bearing 9 and held against longitudinal movement by the shoulder 25′ and lock nuts 26. The journal 27 at the other end of the shaft is fixed in the inner race of the ball bearing 21, the race being fixed between the shaft shoulder 27′ and lock nuts 28. The dust washers in the channels 13 and 23 bear against the respective trunnions of the shaft.

The shaft has fixed thereto or formed integral therewith, between the walls 3, 3′, a cutter head 30 containing slots for the insertion of knives 31 for cutting material on the table 2, the knife slots being so formed and positioned, as described in my copending application, to permit the provisior of trunnions of large diameter.

A fan 32 having axial blades 33 is fixed upon the shaft between the cutter head 30 and the adjacent inner mouth of the motor casing 14, so as to divert dust or detritus formed by the cutter knives from such mouth and draw through the motor casing air admitted thereto through the ports 34 in the outer segment thereof, the motor casing being otherwise substantially air tight.

An electric motor rotor 35 is sleeved on the shaft within the casing 14 and is drawn up tight on the tapered shaft section 27ª by a threaded bushing 36. The stator 37, coacting with the rotor 35, is carried by the intermediate segment of the motor casing 14, such segment being bolted between and having dovetail joints with the end segments.

It will be observed that by the construction above described, I am able to provide a jointer having a comparatively small overall width proportionately to the capacity of the cutter head, due to the elimination of any bearing between the cutter head and motor rotor. In operation, the motor is efficiently cooled and freed from dirt by the suction created by the fan 32, which also blows away chips or shavings made by the cutter knives. Any expansion or contraction of the shaft due to varying temperature conditions is accommodated by the movement of the floating race of the ball bearing 21 so that there is no binding at the bearings, and the bearings are always in alignment since there are but two points of support for the shaft. The machine may be manufactured and assembled with facility by reason of the provision of the means for aligning the bearings both laterally and horizontally and which permits the incorporation of standardized parts in the machine without difficulty.

Having described my invention, I claim:—

1. A jointer comprising a shaft having thereon a cutter head and a motor rotor spaced axially from said head, and bearings for supporting said shaft at the ends only thereof.

2. A jointer comprising a shaft having thereon a cutter head and a motor rotor housed within a casing, having an open mouth adjacent to said head, and a fan on said shaft and disposed in said mouth between said head and the mouth of said casing.

3. A jointer comprising a main frame having a shaft-bearing fixed relatively thereto, a motor frame having a shaft-bearing, said frame having a vertical bearing and a transverse lip engaging said main frame to align said bearings, and a shaft journalled in said bearings and having thereon a cutter head and a motor rotor.

4. A jointer comprising a journaled shaft having concentrically mounted thereon a cutter head, a fan, and a motor rotor, and a casing for said motor having closed peripheral walls and end ports through which air is circulated by the action of said fan, said fan being positioned between said cutter head and said casing.

5. A jointer comprising a frame having walls with top surfaces in the same longitudinal plane, a shaft-bearing fixed on one of said surfaces, a motor casing having a shaft-bearing and a lip engaging the other of said surfaces, and a shaft journalled in said bearing and having fixed thereto a cutter head and a motor rotor.

6. A jointer comprising a frame with substantially parallel walls having top surfaces in the same horizontal plane, a journal box fixed on the horizontal surface of one of said walls and containing an antifriction bearing, a motor casing fixed to the other of said walls and having a part engaging the horizontal surface thereof, said motor casing having a journal box connected therewith and containing an anti-friction bearing, one of said antifriction bearings being held against axial movement and the other being movable axially, and a shaft having trunnions engaged in said antifriction bearings and supported solely thereby, said shaft having thereon a cutter head between said walls and a motor rotor within said casing.

In testimony whereof I have hereunto set my name this 30 day of July 1923.

LELAND B. WHIPPLE.